Patented May 11, 1948

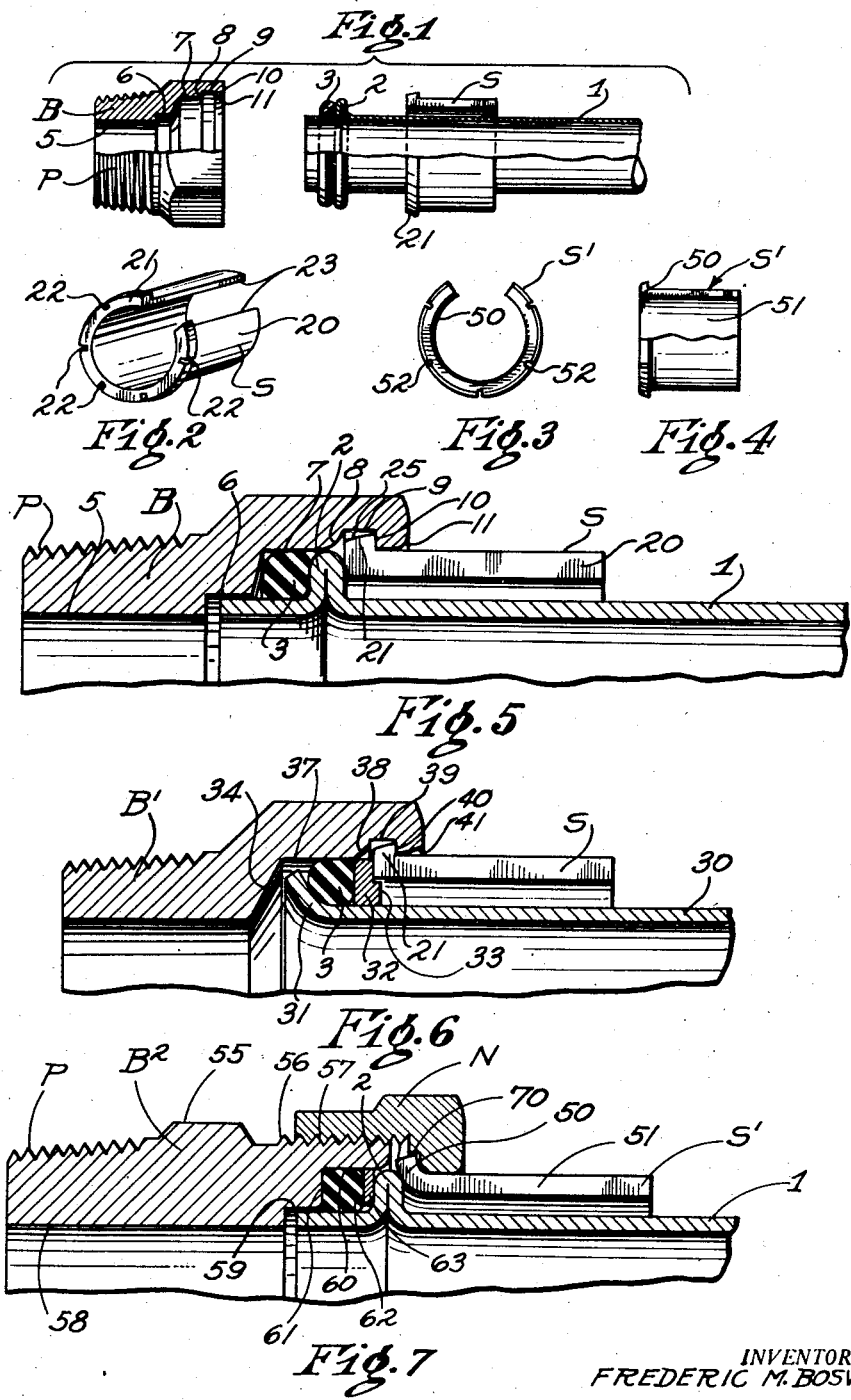

2,441,344

UNITED STATES PATENT OFFICE 2,441,344

COUPLING

Frederic M. Bosworth, Rocky River, Ohio, assignor to The Weatherhead Company, Cleveland, Ohio, a corporation of Ohio Application May 14, 1945, Serial No. 593,641

3 Claims. (Cl. 285—163)

This invention relates to pipe or tube couplings and joints of the quick attachable and detachable type.

It is among the objects of my invention to provide a pipe joint or tube coupling which may be quickly attached and detached preferably by the simple one-handed operation of grasping a part of the joint manually and making the attachment or detachment. Another object is to make a tube or pipe joint which will be vibration resistant, will be threadless and inexpensive of manufacture, and which in at least certain of the preferred forms of my invention will not require the positioning of nuts, washers or other instrumentalities upon the tube or pipe to be connected prior to enlarging the end or other part thereof. Other objects include the provision of a pipe joint or tube coupling which will be simple in its construction, foolproof in operation, tight under fluid pressures both positive and negative and in which the parts can be readily replaced or repaired upon becoming worn or damaged in service.

Other objects will appear from the following description of a preferred and certain modified forms of my invention, reference being had to the accompanying drawings in which Figure 1 is a partial longitudinal sectional view and side elevation of the parts of coupling and the tube to be joined shown in spaced aligned position prior to assembly thereof; Figure 2 is a perspective view of one form of the spring retaining sleeve part of my coupling; Figure 3 is an end view and Figure 4 is a side elevation of a modified form of the spring retaining sleeve part of my coupling; Figure 5 is a partial longitudinal section of the parts shown in Figure 1 in assembled relation; Figure 6 is a view similar to Figure 5 of a modified form of my invention; Figure 7 is a view similar to Figures 5 and 6 of a modified form containing features of my invention.

In Figure 1 I have illustrated my invention in the example of a coupling for a metallic or non-flexible pipe or tube 1 which has an annular rib or enlargement 2 adjacent but spaced from the end thereof that is to be disposed within the body B of the coupling. Carried on the forward end of the tube is a sealing ring or gasket 3 which preferably takes the form of the familiar O-ring. This ring is preferably made of rubber or rubber-like material and preferably has a durometer hardness of about 40 to 60. I also prefer that the ring have a fairly snug slidable fit with the extreme forward end of the tube 1. The ring 3 may be slipped on and off the end of the tube beyond the rib 2 whenever it is desired to form the joint or to remove the ring. The body B of the coupling may take any familiar external form with pipe threads P, for example, at the smaller and leftward end as shown. Internally of the body B is a bore 5 preferably coextensive with the internal configuration and size of the tube 1. Adjacent the inner end of the bore 5 the bore is preferably enlarged a little at a counterbored portion 6 to receive the extreme end of the tube, and then the internal diameter of the body B is enlarged to a greater diameter, preferably within a smooth cylindrical internal surface 7 adapted to receive in close sealing contact the external surface of the gasket 3, see also Figure 5. The internal cylindrical surface 7 preferably terminates at its rightward end, as viewed in the drawings, in a smooth outward flare 8, see also Figure 5, to facilitate the reception of the gasket 3 when the same is moved with the tube bodily inwardly of the body B and within the surface 7 thereof. Near the forward end of the body B, i. e., near the rightward end as viewed in Figure 1, is an undercut groove or channel 9, see also Figure 5, disposed behind an overhanging shoulder 10. The leftward wall of the groove 9 preferably merges with the flared surface 8. Preferably the inside surface or bore 11 of the shoulder 10 is flared a little outwardly at the open end of the body B whereby to facilitate insertion of the parts that enter the body in making the joint. The internal diameter of the bore 11 of the shoulder 10 is preferably somewhat larger than the diameter of the surface 7 whereby to facilitate reception of the packing ring 3 therethrough when the ring and tube is moved from the position shown in Figure 1 to the position shown in Figure 5.

To removably and detachably retain the parts in the assembled relation shown in Figure 5, I provide a split spring retaining sleeve S shown also in Figures 1 and 2. This sleeve is characterized by having a long cylindrical body portion 20 the length of which may preferably be substantially equal to its diameter. On the leftward end as viewed in Figures 1 and 5, I provide an outwardly and angularly disposed radial flange 21 which may be notched as at 22 in a plurality of places to lend flexibility thereto. The sleeve 20 is characterized by its flexibility and resilience and its tendency to expand so that when the flanged end 21 thereof is received within the channel 9 in the body B the spring of the sleeve and flange in its expansive effort will retain the sleeve and the flanged end thereof in the position shown in Figure 5 whereby the end of the sleeve, being retained within the channel 9, will resist outward, i. e., rightward, movement of the tube 1 by engagement wiith the annular rib 2 thereof. When the parts are in an assembled position as shown in Figure 5, the rib 2 will bear longitudinally against the end of the sleeve 20 and be retained in the position shown in Figure 5 so long as the spring sleeve has its flanged end retained in the channel 9. As shown especially in Figure 2 the sleeve 20 is split as at 23 so that it may expand and contract circumferentially under the influence of finger pressure applied to the body of the sleeve. The circumferential dimension of the sleeve S and radial height of the flanged end 21 are preferably such that the slot 23 will not quite close when the sleeve is constricted to engage the outer surface of the tube while at the same time the outside diameter of the flange 21 is smaller than the diameter of the bore 11. The sleeve is preferably flexible and resilient enough so that when the parts are substantially in the position shown in Figure 1, finger pressure exerted upon the sleeve S may reduce its diameter and contract it into contact with the external surface of the tube 1. In this way, gripping the sleeve not only contracts the flange 21 to a diameter small enough to facilitate its entry through the bore 11 of the body B, but also affords a means of holding the tube 1 for movement of the tube 1 and ring 3 into the body B. The rib 2 limits leftward, as viewed, slip of the sleeve along the tube as the tube is moved leftwardly into the body against whatever resistance is offered as between the ring 3 and the flare 8. The flare 8 of the surface 7 permits and facilitates entry of the gasket 3 into the bore of the surface 7 and permits the gasket to be compressed a little radially whereby to have initial radial compression and sealing contact both with the exterior surface of the tube 1 and the internal surface 7 of the body B.

I prefer that the flange 21 of the sleeve S have its external peripheral portion chamfered or tapered a little as at 25 so that in coaction with the flare of the bore 11 of the shoulder 10, the flanged end of the sleeve will more freely enter the bore of the shoulder 10 until the flange is in position to expand outwardly and enter the channel 9 of the body. When the finger or other compression pressure upon this sleeve S is relaxed the sleeve's inherent resiliency causes it to expand outwardly urging the flanged end 21 thereof into the channel 9 and securing the parts against involuntary detachment as shown in Figure 5. The thickness, that is the radial dimension of the flanged end of the sleeve, is such in relation to the size and external diameter of the rib 2 that the parts overlap as shown in Figure 5, whereby the rib 2 cannot escape rightwardly or be moved rightwardly under fluid pressure within the joint so long as the sleeve S is in the expanded position shown in Figure 5. It will also be noted that I prefer that the external diameter of the rib 2 be but little smaller than the internal diameter of the surface 7 whereby to approach contact therewith and resist cold flow or flashing or extrusion of the gasket 3 under the influence of high pressure. Preferably the whole space within which the gasket 3 is contained in the position shown in Figure 5 is not greatly larger in cross section than the cross sectional area of the gasket 3 so that the gasket will not tend to cant or take an inclined position which might interfere with its sealing effect between the surfaces 7 and the external surface of the tube.

Opening of the joint is readily effected by merely grasping the cylindrical part 20 of the sleeve S and squeezing it down to substantial contact with the external surface of the tube 1 whereupon the flanged part 21 of the sleeve is reduced down to a diameter which permits its removal through the bore 11 of the shoulder 10. If the sleeve be gripped firmly enough to have a firm frictional engagement with the external surface of the tube at this time, then the tube will tend to be withdrawn with the withdrawal of the sleeve S. In all events the tube may be withdrawn after the sleeve has been removed from the position shown in Figure 5 by mere forceful withdrawal thereof. The gasket 3 may or may not follow the tube in its withdrawal but if it remains within the body it will merely be in place to receive the tube upon the next insertion thereof.

I have mentioned that the sleeve S is inherently resilient as if it were made of spring tempered steel which is within the purview of my teachings or it may be made of such materials as beryllium copper or such other materials as will have essentially the characteristics and mode of operation above described. The resiliency of the sleeve S is preferably such that it can readily be expanded to a greater internal diameter than the external diameter of the rib 2 whereby it may be removed from the tube 1 by being passed over the rib 2 with or without the packing ring 3 in place. It will also be observed that the packing gasket 3 can be readily removed from or attached or positioned upon the end of the tube 1 leftwardly of the rib 2 whereby gaskets can be replaced or renewed from time to time as need may require. The removability of both the sleeve S and the gasket 3 to the tube 1 after the rib 2 has been formed greatly facilitates use of my coupling inasmuch as the rib may be formed at any time or convenient place and thereafter the sleeve S and the packing ring 3 may be added for the purposes mentioned or may be replaced from time to time as necessity or convenience may require.

The packing ring 3 has been described as being of rubber or rubber-like material and one of the characteristics thereof which I prefer in the form of my invention just above described is that the ring be soft enough to take an initial radial compression without more than substantial manual effort applied by movement of the tube and the end thereof inwardly into the body, and that it be soft enough so that under the influence of fluid pressure it will exert a self-sealing influence to prevent the escape of fluid between the tube and the body of the coupling. Withal I prefer that the character of the packing ring 3 be such that it will not readily "cold flow" or flash out of the space between the peripheral edge of the rib 2 and the surface 7 or between the innermost end of the tube 1 and the surface of the counterbore 6 depending upon the direction of the pressure exerted upon the ring.

In Figure 6 I have shown a modified form of my invention in which the tube 30 has merely a conventional flared end 31. In this form of my invention the packing ring 3, which may substantially correspond to the packing ring above described, is preferably first placed upon the tube before the tube is flared. Adjacent to the packing ring and spaced from the flared end 31 of the tube I provide a washer 32 which may be a bare flat washer, but as shown in Figure 6 I prefer that the washer have an annular shoulder 33. The sleeve S shown in Figure 6 may be substantially identical with the sleeve S above described and may have substantially the same function and mode of operation. It will be noted that when the parts are assembled as shown in Figure 6 that the innermost leftward end of the sleeve S can seat on the annular shoulder 33 of the washer 32 whereby to prevent the sleeve S from inadvertent constriction unless the washer 32 be displaced leftwardly with respect to the adjacent end of the sleeve S. The coupling body B1 in the form of my invention shown in Figure 6 may substantially correspond to the body B above described, but the body B1 of Figure 6 omits the counterbore 6 of the body B and its inner cylindrical bore and surface 37 may be substantially identical with the bore 7 above described having a flared opening 38 to the right, as viewed in Figure 6, to facilitate entry of the packing ring 3. The bore 37 may terminate inwardly in an inclined or other surface 34 which is spaced from the innermost end of the flared end 31 of the tube 30 to permit leftward movement of the tube from the position shown in Figure 6. The body B1, as shown in Figure 6, may have a channel 39 arranged in the same relation to the bore 37 as is the channel 9 related to the bore 7 in the body B above described. The body B1 preferably has the overhanging shoulder 40 and inner flared bore 41 thereof serving the same function in the same way as the above described corresponding parts in the body B.

It will be observed that the channel 39 in body B1 has a greater longitudinal dimension than the thickness of the flange 21 of the sleeve S whereby to permit the sleeve S to be moved leftwardly as viewed in Figure 6 to move the washer 32 as well as the ring 3 and the flared end of the tube leftwardly a distance at least as great as the longitudinal thickness of the shoulder 33. After the parts have been so moved, then by rightward movement of the sleeve S, the sleeve is freed of the shoulder 33 of washer 32 and can be constricted down to a diameter substantially contacting the external diameter of the tube 30 bringing the peripheral edge of the flange 21 out of the channel 39 into a lesser diameter than the bore 41 of the shoulder 40 whereby permitting removal of the sleeve and the tube with the ring 3 and the washer 32 out of the body B1 by rightward movement as viewed in Figure 6. When the parts are assembled as shown in Figure 6 and fluid pressure is exerted within the tube and the coupling body the tendency of the fluid pressure is to cause the gasket 3 to serve its normal self-sealing function and prevent the escape of fluid past the gasket. At the same time fluid pressure tends to move the tube 30 bodily rightwardly and incidentally move the washer 32 rightwardly whereby to lock the sleeve S in its expanded position since the inner periphery of the flange 21 of the sleeve is borne upon and held in its expanded position by the annual shoulder 33 of the washer 32.

In this form of my invention the operations of assembly and disassembly are much the same as those first above described except for the added function of locking the sleeve S in its retaining position by coaction with the shoulder 33 of the washer 32. In this form of my invention the washer 32 preferably has a fairly close free sliding fit externally of the outer surface of the tube 30 and the external diameter of the washer 32 substantially approaches the internal diameter of the surface 37 whereby to prevent extrusion or flashing or cold flow of the packing ring 3 rightwardly of the washer 32. Under negative pressure within the coupling the ring will be forced leftwardly as viewed in Fig. 6, but the negative pressure will tend to constrict the washer or the packing ring 3 into the tapering confines between the flare 31 of the end of the tube and the surface 37 whereby to hold a fluidtight joint under negative pressure.

To make the joint with the parts taking the form shown in Figure 6, the parts first take the relative position of the parts shown in Figure 1. Thereafter the sleeve S is compressed radially until its inner surface substantially contacts the external wall of the tube 30, the flanged end 21 of the sleeve S bearing upon or being positioned longitudinally adjacent the inner radial surface of the shouldered part of the washer 32. Then, all of the assembly being controlled within the grip of the sleeve S, the tube and coacting parts are forcbily entered into the body B1. At this time the gasket 3, which has relatively free passage within the bore 41 of the shoulder 40, is forced into a desirable initial radially compressed condition as it passes within the flare 38 adjacent the cylindrical sealing surface 37. As the parts approach the position shown in Figure 6 the radial compression of the sleeve S may be released to permit the flange thereof to enter the channel 39, and then if the washer 32 and the tube be moved bodily rightwardly as viewed in Figure 6 until the shoulder 33 of the washer 32 underlies the flange 21 as shown in Figure 6, the assembly is locked as first above described.

In Figure 7 I have illustrated an adaptation of features of my invention to that type of joint or coupling in which threaded compressive action is applied to effect the fluid sealing of the joint. Here for illustration I have shown the parts in the assembled state with the pipe or tube 1 corresponding to the tube 1 hereinabove discussed, having the annular rib or enlargement 2 and the smooth extension thereof extending beyond the rib to the innermost end of the tube 1. In this adaptation of my invention the retaining spring sleeve S1 is similar in function and operation to the sleeve S above discussed and is shown also more particularly in Figures 3 and 4. In this form of sleeve I propose merely to flare the end thereof as at 50 whereby to form a radially flanged end for the cylindrical portion 51. The sleeve is split and has substantially the same mode of operation and results as the sleeve depicted and described in Figure 2, the short flare 50 serving the purpose of the flanged part 21 of the sleeve S. The flared flange 50 of the sleeve S1 may be notched as at 52, see Figure 3, to facilitate the flexing of the sleeve in the operation corresponding to that above described in the operation of the sleeve S.

The coupling body B2 may take a conventional external form at its leftward end as with pipe threads P as above discussed and may have a non-circular part 55 adapted to be gripped by a wrench. Forwardly of the external part of the body B2 are threads 56 adapted to coact with the internal threads 57 of a nut N. Internally the body B2 may have a bore 58 corresponding substantially to the bore of the tube 1; may be counterbored as at 59 to receive the innermost end or extreme end of the tube 1, and may have a larger counterbore providing a smooth cylindrical surface 60 bottoming in a radial surface 61 against which a packing ring or gland 62 may be compressed. Preferably a washer 63, having a radial dimension substantially filling the space between the surface 60 and the surface of the tube 1, is disposed between the rib 2 of the tube and the packing ring whereby to substantially close the annular space rightwardly of the ring to facilitate compression thereof. As shown in Figure 7 the nut N has a counterbore 70 within which is received the flared end 50 of the sleeve S1. Forward movement of the nut, i. e., leftwardly as viewed in Figure 7, will advance the sleeve S1 into contact with the rib 2 which in turn will advance the tube 1 and the washer 63 to compress the packing 62 to seal the joint. When the nut is screwed home the parts are forced into the position shown in Figure 1 and the compressive force exertable through the threads 56 and 57 is employed to squeeze the packing ring. In this respect this type of coupling is illustrative of that type of joint in which a high torque is required to effect the sealing whether the latter be in the form of compressing a packing ring or squeezing a flared tube end or otherwise as is known in the prior art. In this form of my invention the sleeve S1 except when constrained by having its flared end gripped between the nut and the rib also has the same function and utility as the sleeve S above described and is adapted upon loosening of the nut N, and prior to removal of the nut from the body, to be squeezed to a contracted position upon the tube 1 whereby to remove the flange 50 from the counterbore 70 of the nut and thereby to detach the assembled parts as by the withdrawal of the sleeve and the tube 1 along with the washer and packing ring on the end of the tube. Assembly of the parts is facilitated by the operation substantially the same as that described above, to wit, contraction of the sleeve S1 as between the thumb and forefinger of the user grips the tube and permits advancing the whole assembly substantially into the position shown in Figure 7, assuming that the nut N has been backed off enough to permit the parts to be freely received. Then the sleeve is permitted to expand to a position in which the flange 50 thereof enters the counterbore 70 of the nut. In this position the parts are substantially as shown in Figure 7 except that they are loosely in position. Thereafter a fraction of a turn or more of the nut brings the parts to the compressed and finally assembled state. Preferably the extreme leftward end of the flange 50 overlies at least part of the rib 2 whereby to resist inadvertent constriction of the sleeve while the nut is being tightened.

While I have illustrated and described a preferred and certain modified form of my invention, modifications, changes and improvements therein will occur to those skilled in the art who come to understand my invention and the practice and advantages thereof, and I do not care to be limited to the forms and particulars herein specifically illustrated and described or in any manner other than by the claims appended hereto.

I claim:

1. The combination of a coupling body having an opening, the rearward portion of said body being adapted to receive the end of a tube through the opening, a rearward portion of said body having an internal undercut groove of greater diameter than that of said opening, the rearward wall of said groove being substantially radial, and a split normally expanded resilient retaining sleeve having a radially enlarged part spaced a substantial distance forwardly of its rearward end, said radially enlarged part being adapted to enter said opening and said groove, said enlarged part having a rearwardly facing radial wall for engagement with the rearward radial wall of said body groove when the sleeve is in its normally expanded condition, there being a substantial portion of said sleeve extending externally of said body with the parts assembled, said sleeve being manually contractable to grip the external wall of a tube to be coupled with the body whereby tube and sleeve can be inserted into said body by manipulation of the sleeve, said sleeve having a forwardly facing wall, said wall being adapted to engage retaining means associated with the tube when the sleeve is in its normally expanded condition and disposed in said body, whereby separation of the parts by axial pressure is positively prevented.

2. The combination of a coupling body having an opening, the rearward portion of said body being adapted to receive the end of a tube through the opening, a rearward portion of said body having an internal undercut groove of greater diameter than that of said opening, the rearward wall of said groove being substantially radial, said body having an annular sealing surface disposed forwardly of said groove, a split normally expanded resilient retaining sleeve having a radially enlarged part spaced a substantial distance forwardly of its rearward end, said radially enlarged part being adapted to enter said opening and said groove, said enlarged part having a rearwardly facing radial wall for engagement with the rearward radial wall of said body groove when the sleeve is in its normally expanded condition, there being a substantial portion of said sleeve extending externally of said body with the parts assembled, said sleeve being manually contractable to grip the external wall of a tube to be coupled with the body whereby tube and sleeve can be inserted into said body by manipulation of the sleeve, said sleeve having a forwardly facing wall, said wall being adapted to engage retaining means associated with the tube when the sleeve is in its normally expanded condition and disposed in said body, whereby separation of the parts by axial pressure is positively prevented, and a resilient packing adapted to be squeezed radially between the outer tube wall and said body sealing surface.

3. The combination of a coupling body having an opening, the rearward portion of said body being adapted to receive the end of a tube through the opening, a rearward portion of said body having an internal undercut groove of greater diameter than that of said opening, the rearward wall of said groove being substantially radial, said body having an annular sealing surface disposed forwardly of said groove, a split normally expended resilient retaining sleeve having a radially enlarged part spaced a substantial distance forwardly of its rearward end, said radially enlarged part being adapted to enter said opening and said groove, said enlarged part having a rearwardly facing radial wall for engagement with the rearward radial wall of said body groove when the sleeve is in its normally expanded condition, there being a substantial portion of said sleeve extending externally of said body with the parts assembled, said sleeve being manually contractable to grip the external wall of a tube to be coupled with the body whereby tube and sleeve can be inserted into said body by manipulation of the sleeve, said sleeve having a forwardly facing wall, said wall being adapted to engage retaining means associated with the tube when the sleeve is in its normally expanded condition and disposed in said body, whereby separation of the parts by axial pressure is positively prevented, and a resilient O-ring packing adapted to be squeezed radially between the outer tube wall and said body sealing surface.

FREDERIC M. BOSWORTH.

REFERENCES CITED

The following references are of record in the file of this patent:

UNITED STATES PATENTS

| Number | Name | Date |
|---|---|---|
| 1,949,451 | Brulatour | Mar. 6, 1934 |

FOREIGN PATENTS

| Number | Country | Date |
|---|---|---|
| 643,721 | Germany | Mar. 25, 1937 |